(12) United States Patent
Cheng

(10) Patent No.: US 7,918,467 B2
(45) Date of Patent: Apr. 5, 2011

(54) FOLDING MECHANISM OF A STROLLER

(76) Inventor: Ying-Hsiung Cheng, Tainan Hsien (TW)

( * ) Notice: Subject to any disclaimer, the term of this patent is extended or adjusted under 35 U.S.C. 154(b) by 415 days.

(21) Appl. No.: 12/222,682

(22) Filed: Aug. 14, 2008

(65) Prior Publication Data

US 2010/0038871 A1 Feb. 18, 2010

(51) Int. Cl.
*B62B 3/02* (2006.01)

(52) U.S. Cl. .......................... 280/38; 280/642

(58) Field of Classification Search .................. None
See application file for complete search history.

(56) References Cited

U.S. PATENT DOCUMENTS

| | | | | |
|---|---|---|---|---|
| 4,648,651 A * | 3/1987 | Hawkes | ............................ | 297/45 |
| 4,765,645 A * | 8/1988 | Shamie | ........................... | 280/644 |
| 5,226,658 A * | 7/1993 | Huang | ........................... | 280/644 |
| 5,288,098 A * | 2/1994 | Shamie | ........................... | 280/642 |
| 5,622,377 A * | 4/1997 | Shamie | ........................... | 280/642 |
| 5,845,925 A * | 12/1998 | Huang | ........................... | 280/642 |
| 6,422,586 B1 * | 7/2002 | Glover | ........................... | 280/647 |
| 6,428,034 B1 * | 8/2002 | Bost | .............................. | 280/650 |
| 6,561,536 B2 * | 5/2003 | Suzuki | ........................... | 280/642 |
| 6,811,178 B2 * | 11/2004 | Tomasi et al. | ................. | 280/650 |
| 6,830,254 B2 * | 12/2004 | Lan | .............................. | 280/47.4 |
| 7,267,358 B2 * | 9/2007 | Chen | ............................. | 280/642 |
| 2006/0131841 A1 * | 6/2006 | Huang | ........................... | 280/647 |
| 2006/0237948 A1 * | 10/2006 | You et al. | ..................... | 280/642 |
| 2008/0143082 A1 * | 6/2008 | Chen et al. | .................... | 280/650 |

* cited by examiner

*Primary Examiner* — J. Allen Shriver, II
*Assistant Examiner* — James Triggs
(74) *Attorney, Agent, or Firm* — Rosenberg, Klein & Lee

(57) ABSTRACT

A foldable stroller includes a rear composite supporting member interposed between and pivoted to two rear supporting rod parts of a frame; the rear composite supporting member can be expanded to hold the stroller in an in-use position, and it can be compressed so as to reduce the width of the stroller when the stroller is not-in-use; the stroller further includes a composite fixing member, which will fix the rear composite supporting member automatically when the rear composite supporting member is moved to the expanded position; the stroller frame has two front supporting rod parts, which each include an upper rod, and a lower rod pivoted to the upper rod; the stroller can be reduced in its height by making the lower rods of the front supporting rod parts become close to the upper rods.

6 Claims, 10 Drawing Sheets

[FOLDING MECHANISM OF A STROLLER]

FOLDING MECHANISM OF A STROLLER

BACKGROUND OF THE INVENTION

1. Field of the invention

The present invention relates to a folding mechanism of a stroller, more particularly one, which allows the stroller to move to such a position as to have a significantly reduced width to be easy to store and transport.

2. Brief Description of the Prior Art

It is convenient and labor-saving to use a stroller to carry babies. However, the frames of currently existing strollers cannot be reduced in the width for the stroller to occupy less space when the stroller is not-in-use. Consequently, the strollers can't be easily stored and transported. Therefore, there is room for improvement.

Therefore, it is a main object of the present invention to provide a foldable stroller to overcome the above problems.

SUMMARY OF THE INVENTION

A foldable stroller in accordance with an embodiment of the present invention includes a rear composite supporting member, which is interposed between and pivoted to two rear supporting rod parts of a frame. The rear composite supporting member can be expanded to hold the stroller in an in-use position, and it can be compressed so as to reduce the width of the stroller for the stroller to be easy to store and transport when the stroller is not-in-use. The stroller further includes a composite fixing member, which will fix the rear composite supporting member automatically when the rear composite supporting member is moved to the expanded position. The stroller frame further has two front supporting rod parts, which each include an upper rod, and a lower rod pivoted to the upper rod; the stroller can be reduced in its height by means of making the lower rods of the front supporting rod parts become close to the upper rods.

BRIEF DESCRIPTION OF THE DRAWINGS

The present invention will be better understood by referring to the accompanying drawings, wherein.

DETAILED DESCRIPTION OF THE PREFERRED EMBODIMENTS

Figure 1:
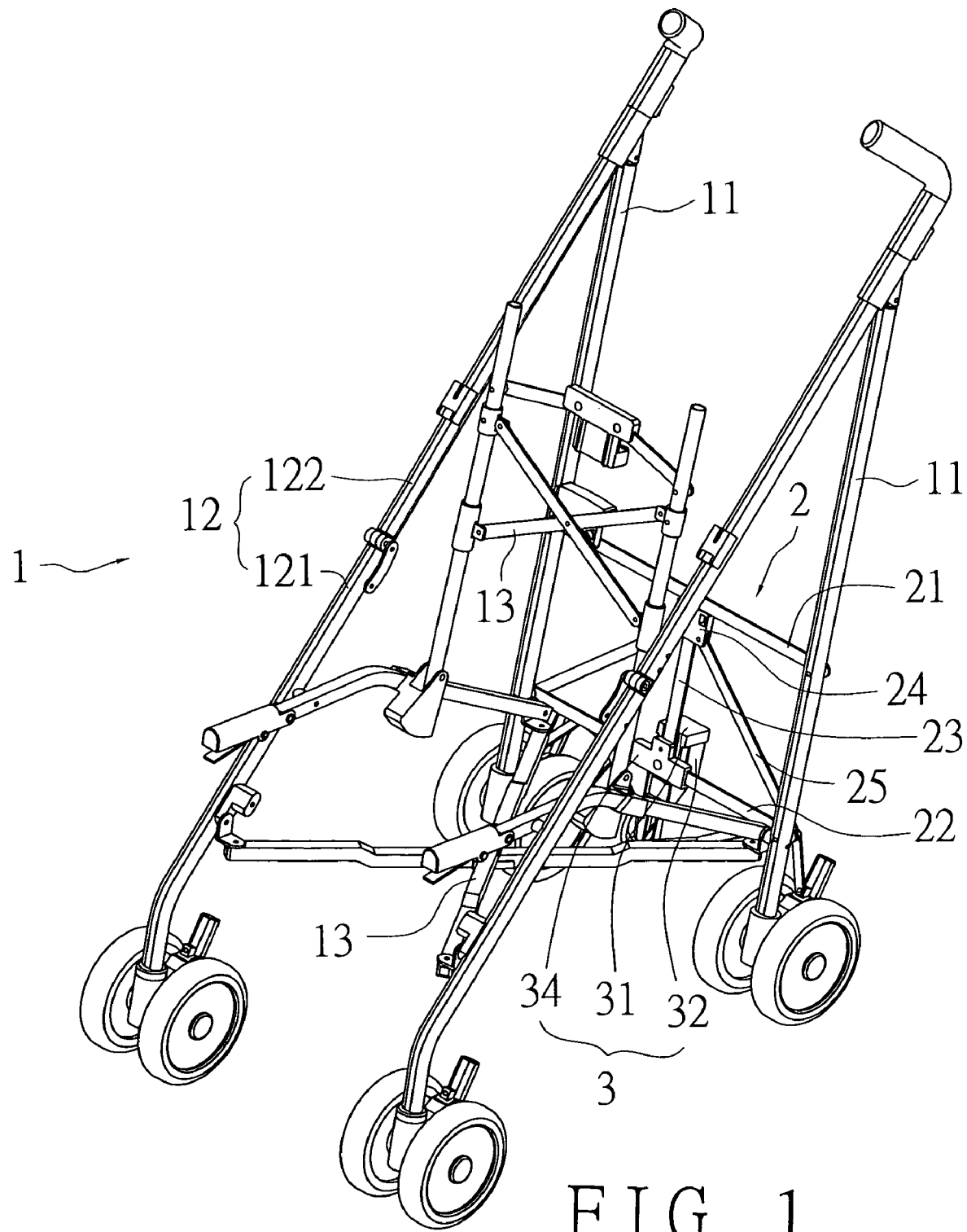
FIG. 1 is a perspective view of a stroller in accordance with the present invention.
Figure 2:
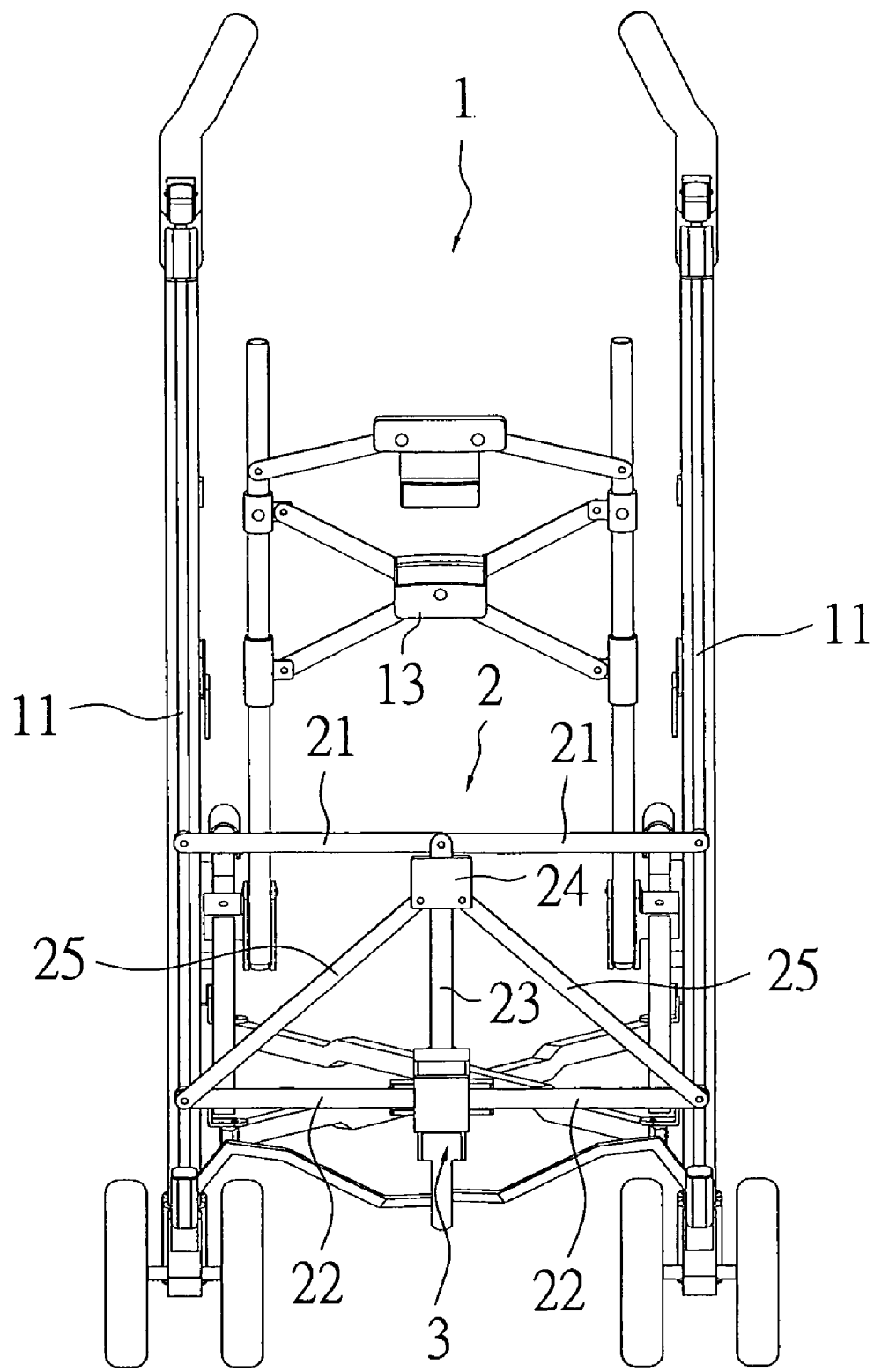
FIG. 2 is a rear view of the stroller of FIG. 1.

Referring to FIGS. 1 and 2, a preferred embodiment of a foldable stroller of the present invention includes a frame 1, a rear composite supporting member 2, and a composite fixing member 3.

The frame 1 includes two rear supporting rod parts 11, two front supporting rod parts 12, a first composite pivotal member 13 interposed between the two front supporting rod parts 12, and a second composite pivotal member 13 joined on the front and the rear supporting rod parts 12 and 11.

Figure 3:
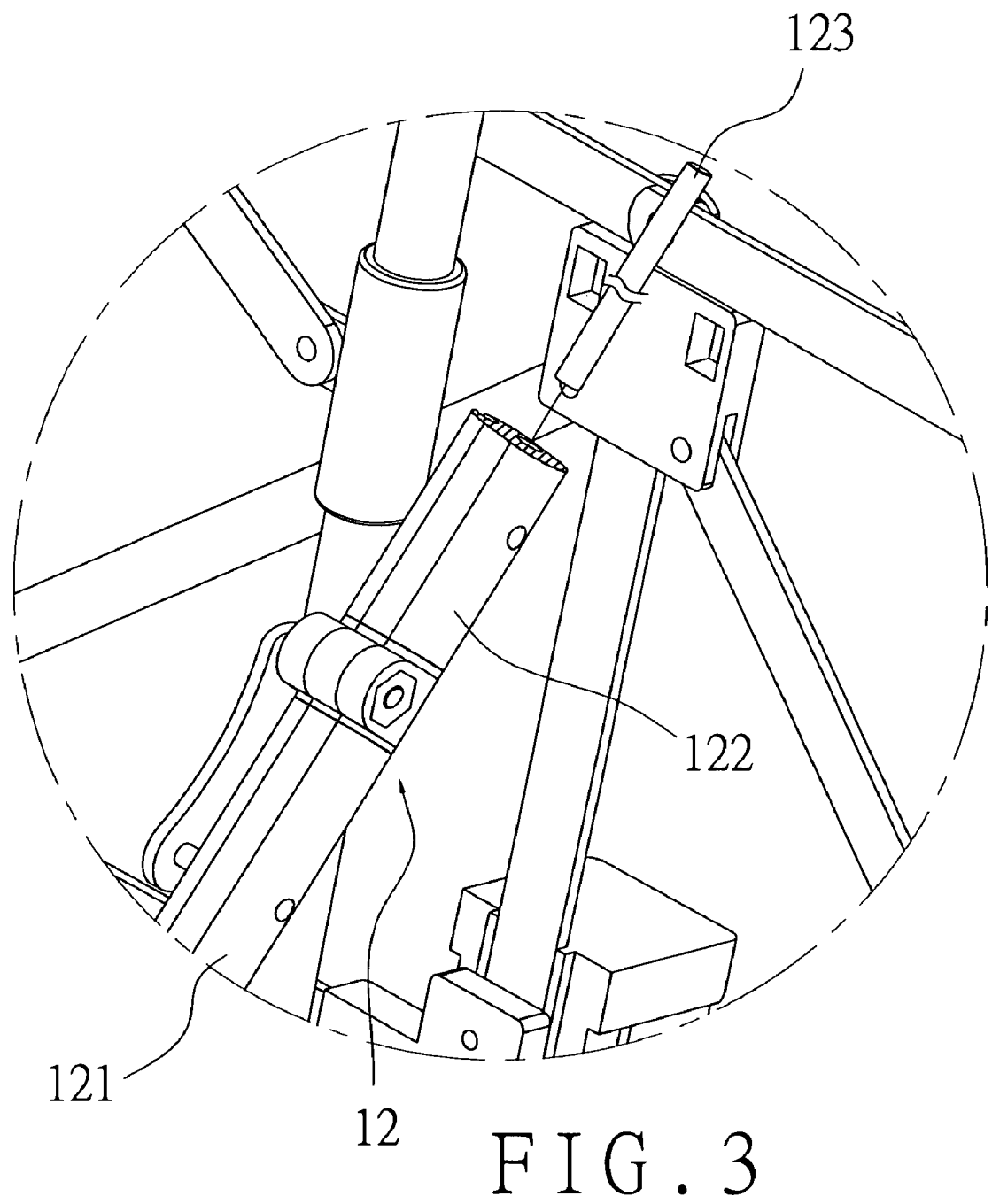
FIG. 3 is a partial perspective view of the front supporting rod part of the stroller in the present invention.
Figure 4:
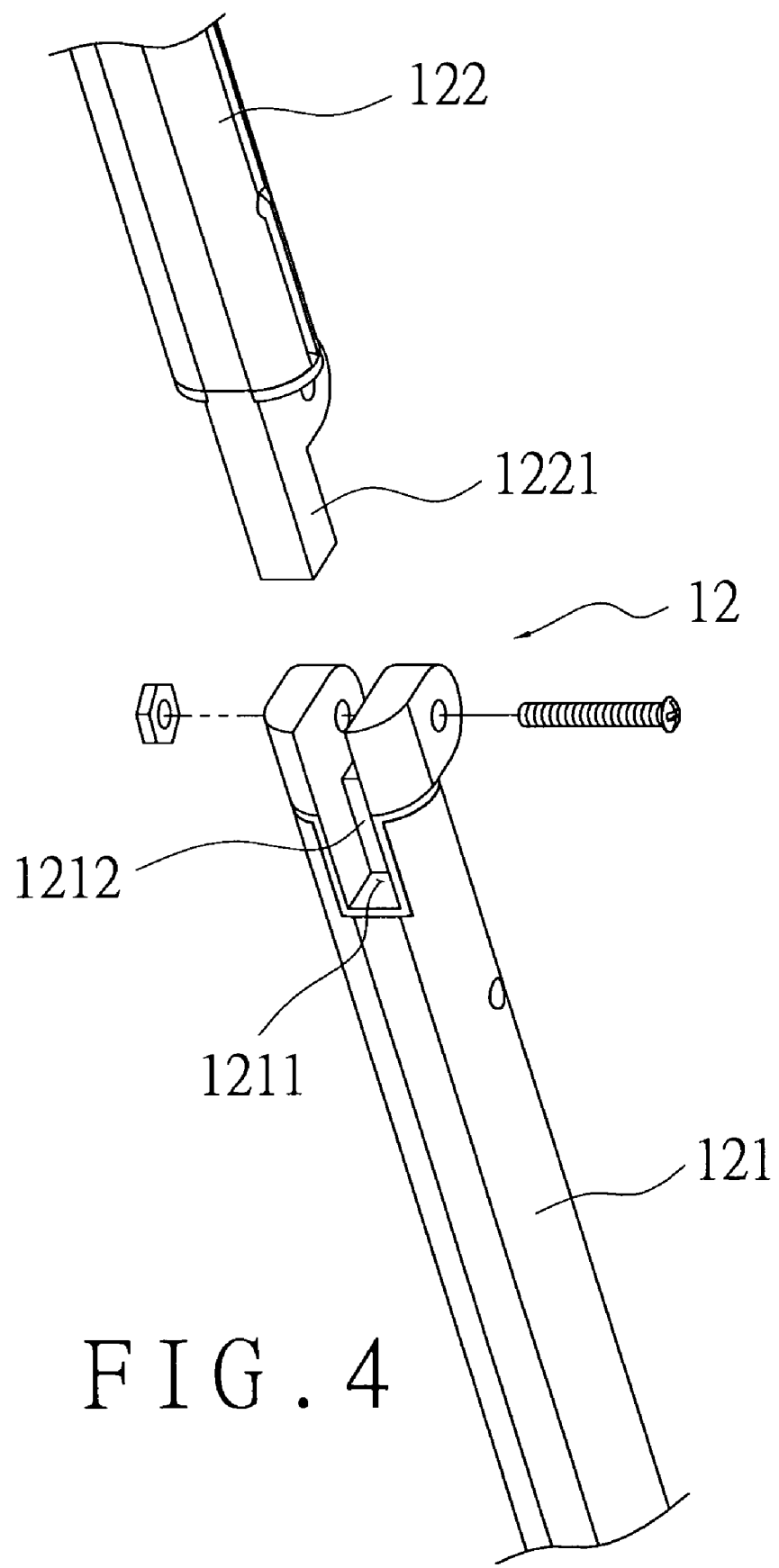
FIG. 4 is a partial exploded perspective view of the front supporting rod part in the present invention.

Referring to FIGS. 3 and 4 as well, each of the front supporting rod parts 12 includes lower and upper rods 121 and 122, which are pivoted together; the lower rod 121 has a holding gap 1211 on an upper end, and a propping portion 1212 in a front portion of the holding gap 1211; the upper rod 122 has a propped protrusion 1221 on a lower end thereof; the upper rod 122 is pivoted to the lower rod 121 at the lower end so that the propped protrusion 1221 will be held in the holding gap 1211 of the lower rod 121, and propped against the propping portion 1212 when the front supporting rod 12 is stretched. In addition, each of the upper rods 122 of the front support rods 12 has a metallic strengthening rod 123 therein, and therefore can't easily bend or break.

Figure 5:
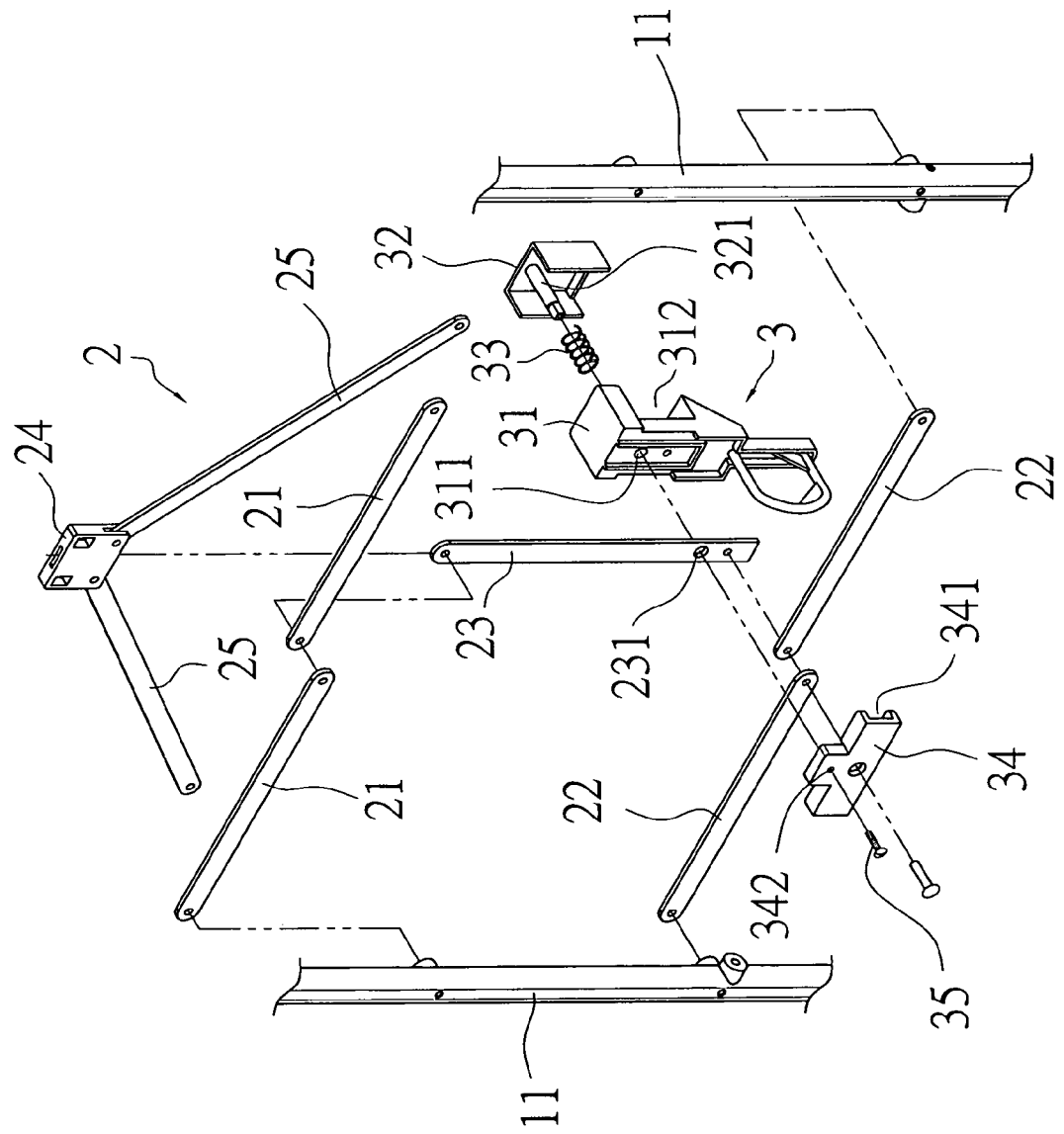
FIG. 5 is an exploded perspective view of the rear composite supporting member in the present invention.

Referring to FIG. 5, the rear composite supporting member 2 is interposed between the two rear supporting rod parts 11, and includes:

two upper horizontal rods 21, which are pivoted together at adjacent inward ends thereof, and which are each pivoted on a corresponding rear supporting rod part 11 of the frame 1 at an outward end;

two lower horizontal rods 22, which are pivoted together at adjacent inward ends thereof, and which are each pivoted on a corresponding rear supporting rod part 11 of the frame 1 at an outward end thereof;

an upright rod 23, which is joined on a pivotal joint of the two upper horizontal rods 21 at an upper end, and joined on a pivotal joint of the lower horizontal rods 22 at a lower end thereof so that all of the upper and the lower horizontal rods 21 and 22 will pivot relative to the upright rod 23 when the rear composite supporting member 2 is being moved between a folded position and an expanded one; the upright rod 23 has a through hole 231;

a movable joining part 24, which is positioned around the upright rod 23 in a movable manner; and two sloping rods 25, which are pivoted to the movable joining part 24 at inward ends thereof, and which are each pivoted at an outward end thereof to a respective one of the pivotal joints between the rear supporting rod parts 11 and the lower horizontal rods 22.

The composite fixing member 3 includes:

a fixing component 31, which is securely joined on the upright rod 23 of the rear composite supporting member 2; the fixing component 31 has a through hole 311 facing the through hole 231 of the upright rod 23; the fixing component 31 has an holding gap 312 thereon, which faces in a rearward direction of the stroller;

a pressing component 32 held in the holding gap 312 of the fixing component 31; the pressing component 32 has a joining stick 321 secured therein; the pressing component 32 is joined on the fixing component 31 with the joining stick 321 thereof being held in the holding gap 312 and passed through both the through hole 311 of the fixing component 31 and the through hole 231 of the upright rod 23;

an elastic element 33 positioned around the joining stick 321 with two ends thereof contacting the fixing component 31 and the pressing component 32, thus biasing the pressing component 32 away from the holding gap 312 of the fixing component 31;

a gripping piece 34, which is positioned near to the upright rod 23 and the fixing component 31, and which is used to fix the lower horizontal rods 22 of the rear composite supporting member 2 when the rear composite supporting member 2 is in an expanded position; the gripping piece 34 has a joining hole 342, and an embedding groove 341 facing the pivotal joint between the lower horizontal rods 22; the gripping piece 34 is joined to the pressing component 32 by means of a joining piece 35, which is passed through the joining hole 342 of the gripping piece 34 as well as the through holes 311 and 231, and securely joined to the joining stick 321; thus, the pressing component 32 and the gripping piece 34 together are biased towards a rear of the stroller.

Figure 6:
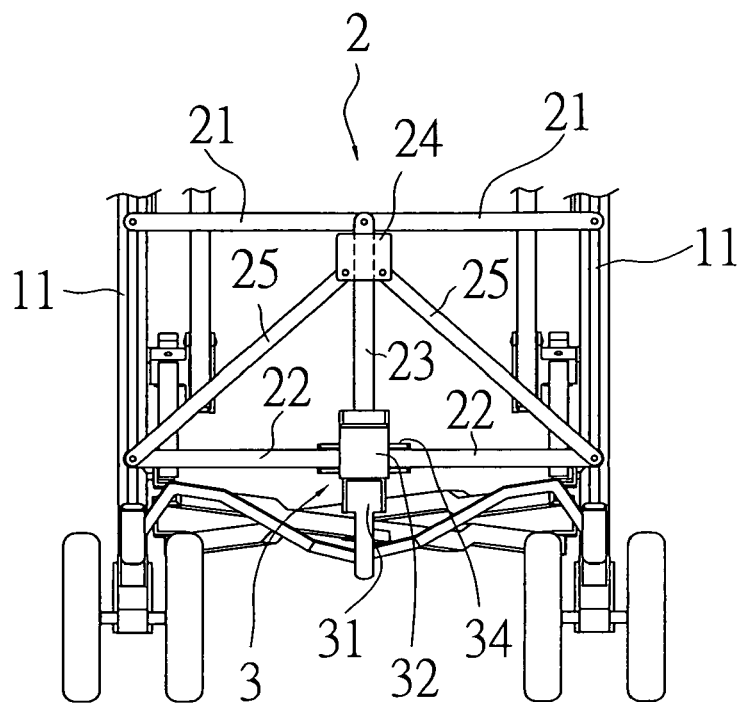
FIG. 6 is a rear view of the rear composite supporting member in an expanded position.
Figure 7:
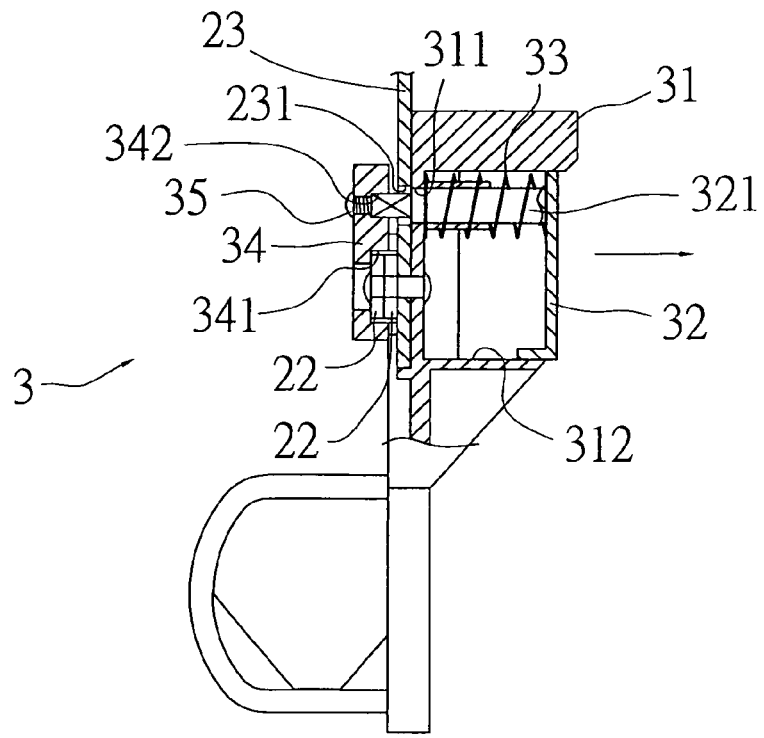
FIG. 7 is a lateral sectional view of the rear composite supporting member in an expanded position.

FIG. 6 is a partial rear view of the stroller of the present invention in the expanded position, and FIG. 7 is a partial lateral sectional view of the stroller in the expanded position; when the stroller is being stretched, the rear supporting rod parts 11 will cause the rear composite supporting member 2 to move together with it. Therefore, the rear composite supporting member 2 will expand with the upper horizontal rods 21 and the lower horizontal rods 22 pivoting to a horizontal position, the sloping rods 25 becoming less steep, and with the movable joining part 24 sliding on the upright rod 23. When the stroller has been moved to the completely expanded position, the inward end portions and the pivotal joint of the lower horizontal rods 22 will be embedded in the embedding groove 341 of the gripping piece 34, and the elastic element 34 will exert a rearward force on both the pressing component 32 and the gripping piece 34 so as to prevent the embedding groove 341 of the gripping piece 34 from separating from the lower horizontal rods 22; thus, the rear composite supporting member 2 can't fold.

Figure 8:
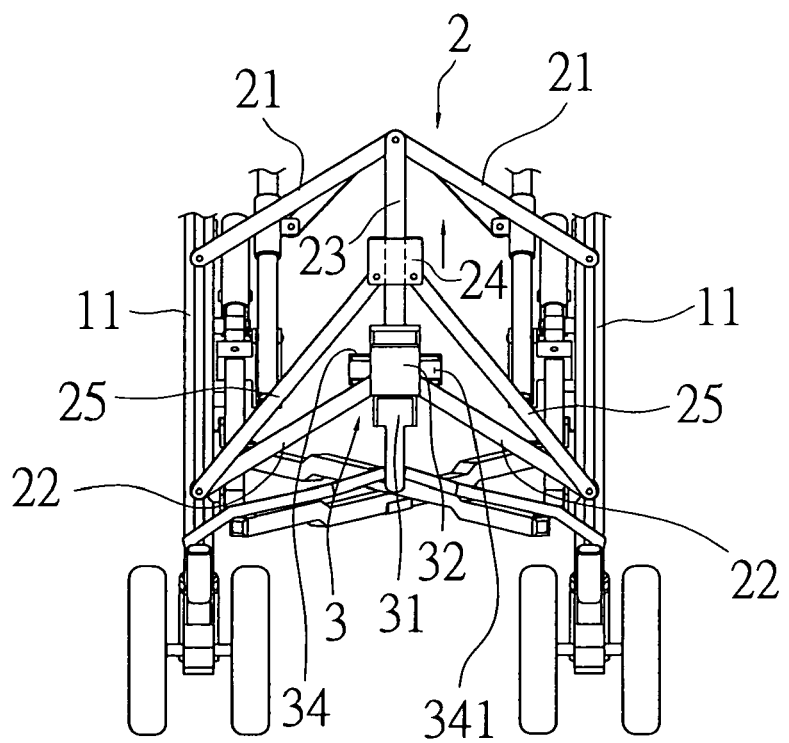
FIG. 8 is a rear view of the rear composite supporting member in a compressed position.
Figure 9:
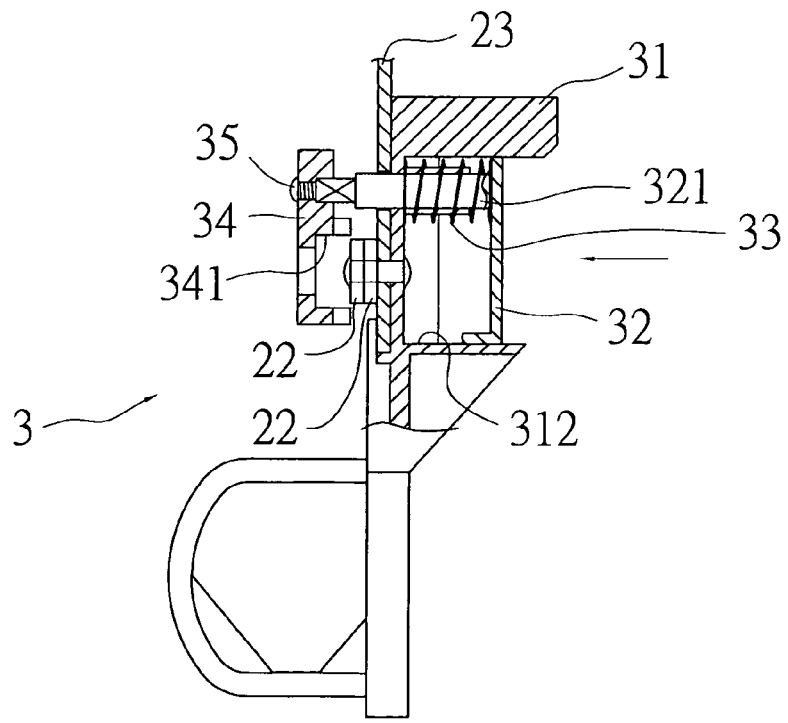
FIG. 9 is a lateral sectional view of the rear composite supporting member in a compressed position.
Figure 10:
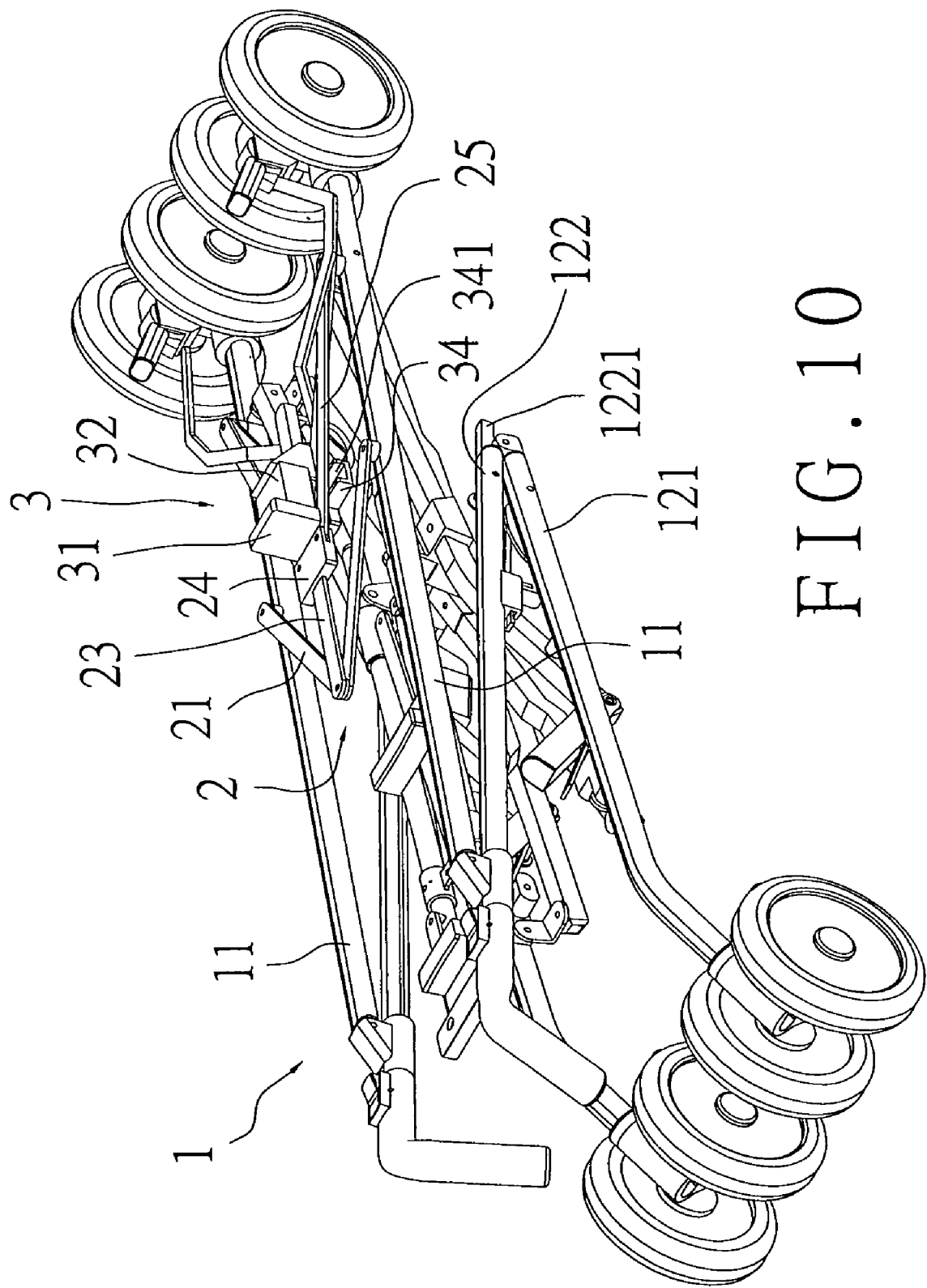
FIG. 10 is a perspective view of the stroller in a folded position.
Figure 11:
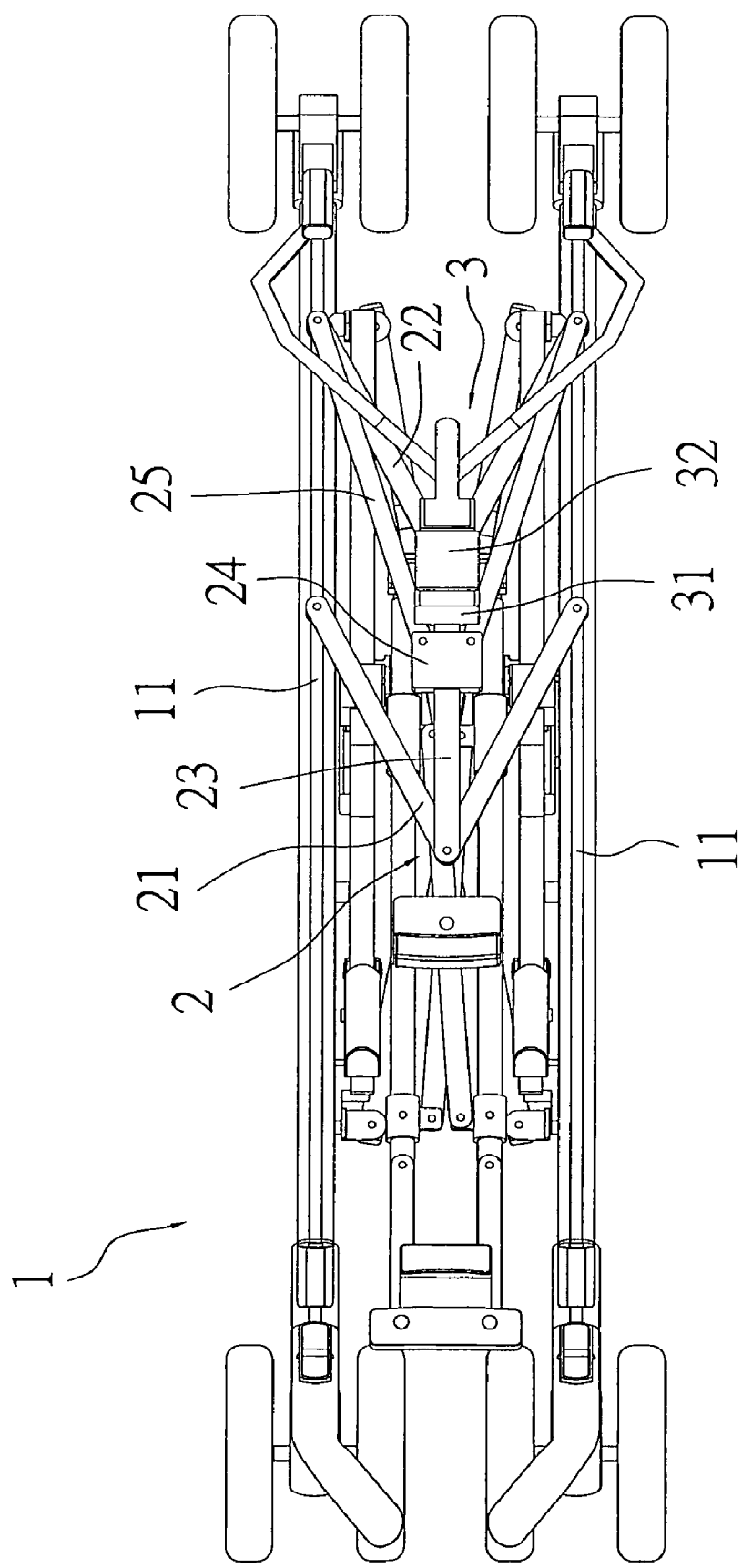
FIG. 11 is a rear view of the stroller in a folded position.
Figure 12:
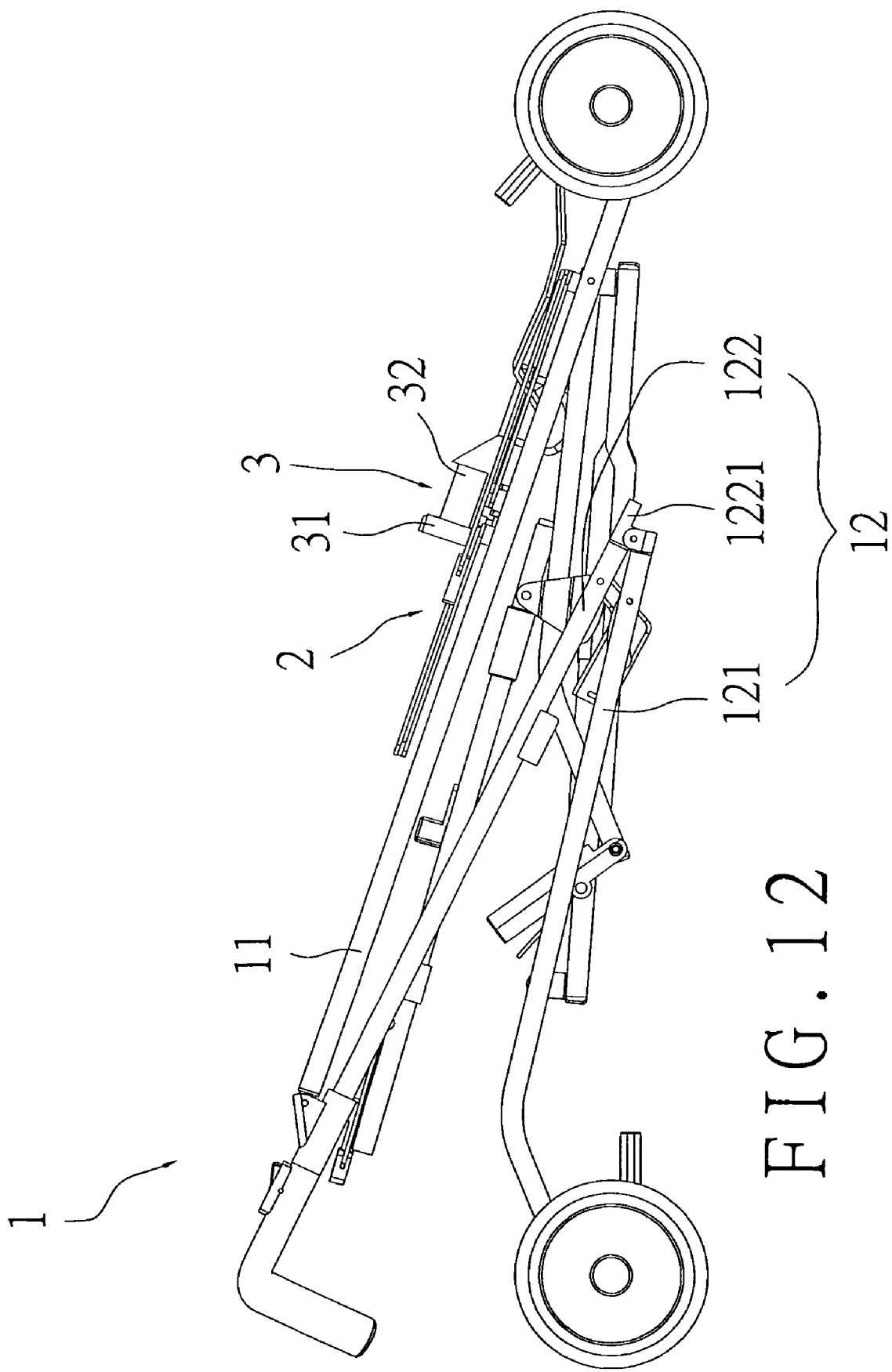
FIG. 12 is a side view of the stroller in a folded position.

FIG. 8 is a partial rear view of the stroller of the present invention in the folded position, and FIG. 9 is a partial lateral sectional view of the stroller in the folded position; to move the stroller from the expanded position to the folded one, the user first has to press the pressing component 32 so that the pressing component 32 is received in the holding gap 312 of the fixing component 31, and the gripping piece 34 of the composite fixing member 3 is away from the lower horizontal rods 22; thus, the lower horizontal rods 22 are no longer embedded in the embedding groove 341, and the rear composite supporting member 2 is no longer fixed in the expanded position by the composite fixing member 3. Next, the user compresses the rear composite supporting member 2 so that the rear supporting rod parts 11 of the frame 1 become close to each other, and the front supporting rod parts 12 also become close to each other, and the composite pivotal members 13 are compressed. Then, the lower rods 121 of the front support rod parts 12 are pivoted upwards to be close to the upper rods 122. Consequently, the stroller is in the folded position for easy storage and transportation, as shown in FIGS. 10, 11, and 12.

From the above description, it can be seen that the stroller of the present invention has the following advantages:

The rear composite supporting member will be fixed by means of the composite fixing member so as to prevent the stroller from accidentally folding when the stroller is moved to the expanded in-use position. And, after the pressing component of the composite fixing member is pressed, the rear composite supporting member can be compressed so that the stroller reduces in its width to be easy to store and transport. Secondly, the upper rods of the front supporting rod parts can be pivoted to be close to the lower rods so as to reduce the height of the stroller after the stroller is reduced in its width. Therefore, the present invention is practical and convenient to use.

What is claimed is:

1. A folding mechanism of a stroller, comprising
   (a) a rear composite supporting member interposed between and pivoted to two rear supporting rod parts of the stroller; the rear composite supporting member including:
   two upper horizontal rods; the upper horizontal rods being pivoted together at adjacent inward ends thereof; the upper horizontal rods being each pivoted on a corresponding said rear supporting rod part at an outward end thereof;
   two lower horizontal rods; the lower horizontal rods being pivoted together at adjacent inward ends thereof; the lower horizontal rods being each pivoted on a corresponding said rear supporting rod part at an outward end thereof; and
   an upright rod; the upright rod being pivoted on a pivotal joint between the upper horizontal rods; the upright rod being pivoted on a pivotal joint between the lower horizontal rods; the upright rod having a through hole;
   (b) a composite fixing member to fix the rear composite supporting member in an expanded position; the composite fixing member including:
   a fixing component securely joined on the upright rod of the rear composite supporting member; the fixing component having a through hole facing the through hole of the upright rod; the fixing component having an holding gap thereon;
   a pressing component held in the holding gap of the fixing component; the pressing component having a joining stick; the pressing component being joined on the fixing component with the joining stick being held in the holding gap and passed through the through holes of the fixing component and the upright rod;
   an elastic element, which is positioned around the joining stick with two ends thereof contacting the fixing component and the pressing component; the elastic element biasing the pressing component away from the holding gap of the fixing component;
   a gripping piece to fix the lower horizontal rods of the rear composite supporting member in an expanded position; the gripping piece having a joining hole; the gripping piece being joined on the joining stick of the pressing component with a joining piece being passed through the joining hole and joined to the joining stick so that the gripping piece is movable together with the pressing component; the gripping piece having an embedding groove; the lower horizontal rods being at least partly held in the embedding groove of the gripping piece so as not to pivot relative to each other when the rear composite supporting member is in said expanded position.

2. The folding mechanism of a stroller as claimed in claim 1, wherein the rear composite supporting member further includes:
   a movable joining part positioned around the upright rod; and
   two sloping rods, which are each pivoted to the movable joining part at a first end thereof, and which are each pivoted at other end thereof to a respective one of the pivotal joints between the lower horizontal rods and the rear supporting rod parts.

3. The folding mechanism of a stroller as claimed in claim 1, wherein the stroller further includes two front supporting rod parts, a first composite pivotal member interposed between the front supporting rod parts, and a second composite pivotal member joined on the front and the rear supporting rod parts.

4. The folding mechanism of a stroller as claimed in claim 1, wherein the stroller further includes two front supporting rod parts;
    each of the front supporting rod parts including a lower rod and an upper rod pivoted to the lower rod; the upper rod having a propped protrusion on a lower end thereof; the lower rod having a holding gap on an upper end, and a propping portion, which is in a front portion of the holding gap, and which will prop the propped protrusion of the upper rod when the front supporting rod is in a stretched position.

5. The folding mechanism of a stroller as claimed in claim 4, wherein each of the upper rods of the front supporting rod parts has a strengthening rod therein.

6. The folding mechanism of a stroller as claimed in claim 5, wherein the strengthening rods are made of metal.

\* \* \* \* \*